(12) United States Patent
Shipman, Jr.

(10) Patent No.: US 12,074,626 B1
(45) Date of Patent: Aug. 27, 2024

(54) SECURED HOUSING FOR ELECTRONIC DEVICE AND METHOD FOR ENCASING AN ELECTRONIC DEVICE

(71) Applicant: Tech Friends, Inc., Jonesboro, AR (US)

(72) Inventor: Bobby L Shipman, Jr., Jonesboro, AR (US)

(73) Assignee: TECH FRIENDS, INC., Jonesboro, AR (US)

( * ) Notice: Subject to any disclaimer, the term of this patent is extended or adjusted under 35 U.S.C. 154(b) by 1022 days.

(21) Appl. No.: 17/002,533

(22) Filed: Aug. 25, 2020

Related U.S. Application Data

(63) Continuation-in-part of application No. 16/045,417, filed on Jul. 25, 2018, now Pat. No. 10,838,464, which is a continuation-in-part of application No. 16/033,045, filed on Jul. 11, 2018, now Pat. No. 10,678,302, which is a continuation-in-part of application No. 15/136,604, filed on Apr. 22, 2016, now Pat. No. 10,225,734, which is a continuation-in-part of application No. 14/923,271, filed on Oct. 26, 2015, now Pat. No. 10,256,645, which is a continuation-in-part of application No. 14/869,592, filed on Sep. 29, 2015, now Pat. No. 9,917,455.

(51) Int. Cl.
| | | |
|---|---|---|
| *H04B 1/3888* | (2015.01) | |
| *B32B 5/18* | (2006.01) | |
| *B32B 5/24* | (2006.01) | |
| *B32B 5/26* | (2006.01) | |
| *B32B 27/12* | (2006.01) | |
| *G06F 1/16* | (2006.01) | |

(52) U.S. Cl.
CPC ............. *H04B 1/3888* (2013.01); *B32B 5/18* (2013.01); *B32B 5/245* (2013.01); *B32B 5/26* (2013.01); *B32B 27/12* (2013.01); *G06F 1/1656* (2013.01); *B32B 2260/021* (2013.01); *B32B 2260/046* (2013.01); *B32B 2307/558* (2013.01); *B32B 2571/02* (2013.01)

(58) Field of Classification Search
CPC ......... H04B 1/3888; B32B 5/18; B32B 5/245; B32B 5/26; B32B 27/12; B32B 2260/021; B32B 2260/046; B32B 2307/558; B32B 2571/02; G06F 1/1656
USPC ...................................................... 455/575.8
See application file for complete search history.

(56) References Cited

U.S. PATENT DOCUMENTS

| | | | | |
|---|---|---|---|---|
| 6,610,173 B1 * | 8/2003 | Lindsay | ................ | D21F 11/006 162/111 |
| 2014/0251368 A1 * | 9/2014 | Lawson | ................ | A45C 13/02 206/37 |

* cited by examiner

*Primary Examiner* — Eugene Yun
(74) *Attorney, Agent, or Firm* — Schrantz Law Firm, PLLC; Stephen D. Schrantz

(57) ABSTRACT

The housing provides layers of rigid material, a cut resistant layer, such as a cut resistant fabric layer, and cushioning around the components of a mobile electronic device, such as a tablet. The electronic device is at least partially encased within the housing providing a cut resistant layer within a rigid layer. The housing may provide two layers of cut resistant fabric, an outer layer impregnated with the rigid layer and an inner layer that maintains the properties of the cut resistant fabric. Cushioning located internally of the rigid layer and the cut resistant layers at least partially surround the components of the electronic device.

20 Claims, 6 Drawing Sheets

SECURED HOUSING FOR ELECTRONIC DEVICE AND METHOD FOR ENCASING AN ELECTRONIC DEVICE

CROSS-REFERENCE TO RELATED APPLICATIONS

This application is a continuation in part of U.S. patent application Ser. No. 16/045,417 entitled INTERNAL SUPPORT FOR ELECTRONIC DEVICE AND METHOD FOR ENCASING AN ELECTRONIC DEVICE filed on Jul. 25, 2018 which is a continuation in part of U.S. patent application Ser. No. 16/033,045 entitled SECURE CHARGING SYSTEM FOR ELECTRONIC DEVICES filed on Jul. 11, 2018 that issued as U.S. Pat. No. 10,678,302 on Jun. 9, 2020 that is a continuation in part of U.S. patent application Ser. No. 15/136,604 entitled "SECURED STORAGE FOR ELECTRONIC DEVICES" that was filed on Apr. 22, 2016 that issued as U.S. Pat. No. 10,225,734 on Mar. 5, 2019 which is a continuation in part of U.S. patent application Ser. No. 14/923,271 entitled "Protective Housing" that was filed on Oct. 26, 2015 that issued as U.S. Pat. No. 10,256,645 on Apr. 9, 2019 which is a continuation in part of U.S. patent application Ser. No. 14/869,592 entitled "Charging Unit and System" that was filed on Sep. 29, 2015 that issued as U.S. Pat. No. 9,917,455 on Mar. 13, 2018.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to a housing for protecting a mobile computing device, such as a tablet. The housing partially encloses the components of the mobile electronic device while providing a viewing window for viewing the display. The housing provides a rigid material that at least partially encloses the electronic device. An outer cushioning layer may be located as the outermost surface to provide additional impact resistance. Different embodiments of the present invention may provide different types of outer layers depending on the environment in which the device is used. One embodiment provides a hard, rigid surface as the outermost surface of the housing. Another embodiment provides an outer cushioning layer as the outer layer of the housing.

To increase protection of the components and reduce tampering and/or damage to the device, the electronic device is partially wrapped in at least one layer of cut resistant fabric (such as Cut-Tex®), preferably two layers of cut resistant fabric. The cut resistant fabric provides additional protection that limits a user's ability to access the mobile computing device and the components of the device. The cut resistant fabric limits damage to the device caused by cutting into the rigid layer. The cut resistant fabric limits access to the device and the components of the device.

The housing provides at least one layer, preferably two layers, of cut resistant fabric, an outer layer and an inner layer. The two layers can be constructed from a single piece of cut resistant fabric or multiple pieces of cut resistant fabric. The housing having a single layer includes a single layer of cut resistant fabric. The single layer of one embodiment may be impregnated with the rigid layer or contact the rigid layer when in liquid or flowable state to form a more rigid cut resistant fabric layer. In another embodiment, the cut resistant fabric layer maintains the characteristics of the cut resistant fabric without being impregnated or otherwise modified by the rigid layer.

The housing having multiple layers provides an inner layer and an outer layer of the cut resistant fabric. The outer layer of the fabric layer is embedded in the rigid layer to meld the cut resistant fabric with the rigid layer. Such an outer layer is impregnated with the rigid material to increase rigidity of the cut resistant fabric. Combining the cut resistant fabric with the plastic, such as polyurea, increases the rigidity of the cut resistant fabric thus increasing the difficulty of repositioning the outer layer of the cut resistant fabric.

The housing also provides an inner fabric layer. The inner fabric layer is not mixed with the rigid layer. Such an inner fabric layer maintains the properties of the fabric without being mixed with the rigid layer.

The housing also provides internal support for the components of an electronic device and a housing that provides layers of rigid material and cushioning around the components of a mobile electronic device, such as a tablet. The rigid material includes a positioning frame that positions the display, the battery, and the circuit board. Cushioning positioned exterior of the frame provides additional cushion around the components of the mobile electronic device.

II. Description of the Known Art

Certain problems exist with the known art. The known art does not provide sufficient support, structure, and cushioning to the internal components of a mobile computing device. The known art does not provide sufficient protection for the device to limit damage from drops, throws, moisture, and other environmental factors. The present invention provides a housing that limits access into the device and provides a rigid positioning frame that secures the internal components of the device within a protective layer, such as a cushioning layer. The rigid frame provides additional structure to the display, the touchscreen, and the circuit board to reduce the likelihood of twisting, torqueing, cracking, or otherwise damaging the mobile electronic device.

Cushioning around the components and the positioning frame reduce exposure of the components to environmental factors. The foam limits the water, dust, moisture, and chemicals exposed to the components.

Known housings for tablets and other electronic devices provide unfettered access to the device. Known housings allow access to some buttons and other inputs that can disable certain security features.

Known housings do not securely store the devices within the housing to prevent unauthorized access. Instead, people are allowed to freely remove the devices from the housing.

Therefore, the present invention is needed to provide a durable housing that reduces the likelihood of damaging the internal components of the mobile electronic device. The housing also reduces access to the mobile electronic device to limit unauthorized tampering of the device. The present invention securely stores the device to limit access to features of the device.

SUMMARY OF THE INVENTION

The present invention relates to a protective housing for a mobile electronic device, including, but not limited to tablets, smart phones, mobile electronic devices, mobile computing devices, and other electronic devices. The mobile computing devices may include, but are not limited to, tablets, smart phones, iPads, iPods, iPhones, Android devices, Raspberry Pi, Arduino device, MP3 players, wearable devices, fitness trackers, digital audio players, and digital media players.

The housing of the present invention provides a rigid layer that protects the display and other components of the device. A layer of cut resistant fabric located internally of the rigid layer adds additional protection to the device and the components. The cut resistant fabric limits the user's abilities to cut through the housing. The rigid layer combined with the cut resistant fabric layer forms a housing that is difficult to open or otherwise damage the housing to gain access to the mobile computing device and components.

The housing of the present invention also provides a protective cushioning layer around the components of the mobile electronic device. Such cushioning protects the device from drops, falls, or other damage to the device.

The housing also provides a positioning frame and a support rib that extend across the components of the device. The positioning frame and support rib of one embodiment are located internal of the housing. In another embodiment, the positioning frame is located internal of the housing. The positioning frame and the support rib limit deformation of the components of the device to reduce the likelihood of damaging the device.

In one embodiment, the housing secures the device to prevent unauthorized access. Most devices provide a port for accepting a charger. The charging port may accept USB, USB micro, USB mini, Lightning, or other electrical insertion connection. New connections with new ports will more than likely be developed in the future. The housing of one embodiment blocks access to such a port. In another embodiment, the port has been removed from the device. In another embodiment, the housing blocks access to buttons and other features of the device. Eliminating access to these features prevents users from gaining unauthorized access to the device. The housing also prevents users from resetting the device to allow unfettered access to the user.

It is an object of the present invention to protect a device.

It is an object of the present invention to cushion (reduce shock) the components of the device.

It is also an object of the present invention to reduce cutting into the housing.

It is also an object of the present invention to limit access into the housing.

It is also an object of the present invention to provide a tamper resistant housing to protect the mobile computing device and the components.

It is an object of the present invention to provide an internal structure within the housing that reduces deformation on components of the device.

It is an object of the present invention to provide additional protection to the device.

It is another object of the present invention to reduce access to the mobile electronic device.

It is another object of the present invention to obstruct buttons on the device to prevent users from accessing certain features of the mobile electronic device.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
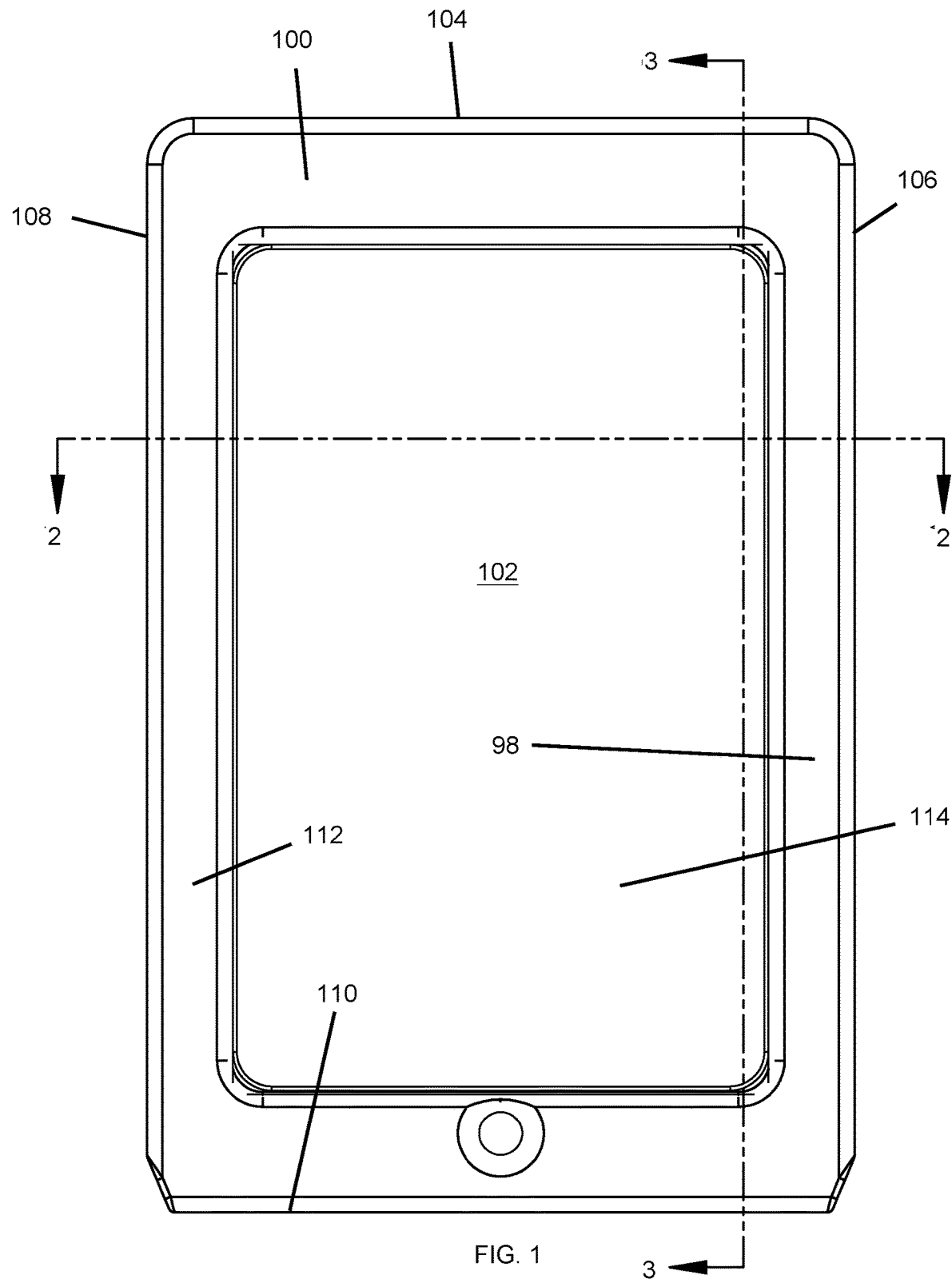
FIG. 1 is a front view of one embodiment of the present invention.
Figure 4:
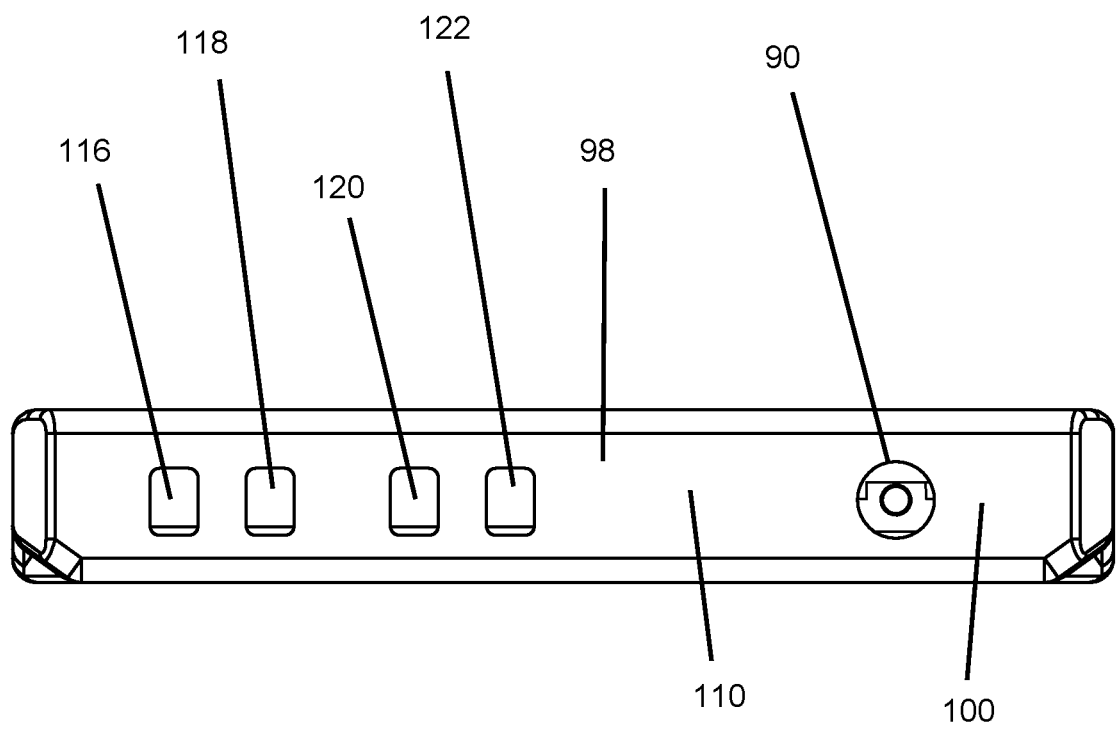
FIG. 4 is a bottom view thereof.

FIG. 1 shows one embodiment of the housing 100 on the mobile electronic device 102. The housing 100 partially encompasses the mobile electronic device 102 to protect the device. A viewing window 114 in the housing provides access to the display and the touchscreen. Walls 104, 106, 108, 110 form a rigid layer 98 of the housing 100. In one embodiment, walls 104, 106, 108, 110 provide no access to the device 102. Instead, contacts 116, 118, 120, 122 shown in FIG. 4 connect to the device for charging and for communication, such as the contact discussed in U.S. patent application Ser. No. 16/033,045 entitled SECURE CHARGING SYSTEM FOR ELECTRONIC DEVICES filed on Jul. 11, 2018 which is incorporated herein by reference. In such an embodiment, the walls 104, 106, 108, 110 prevent access to any ports or other buttons that allow resetting the device or unauthorized access of the device. The rigid layer 98 provides an opening 90 for connection of an audio device, such as an audio jack, as shown in FIG. 4.

In one embodiment, the housing 100 is constructed from a rigid material, including but not limited to plastic, a 70D plastic, a metal, polyurea plastic, aluminum, a semi-rigid material, or other rigid material. In one embodiment, the housing 100 is formed around the mobile computing device, such that the housing is constructed from a single, unitary piece of rigid material. The computing device and at least one layer of cut resistant fabric are placed within a mold.

One embodiment of the present invention provides two layers of cut resistant fabric. The two layers may be constructed from a single piece of fabric, such as a piece of fabric folded onto itself, or multiple pieces of fabric. The outer layer of the cut resistant fabric is impregnated with the plastic, such as the polyurea plastic. Impregnating the cut resistant fabric with the polyurea creates an outer layer of a hybrid fabric layer that is more rigid than the traditional cut resistant fabric. The polyurea does not impregnate the inner layer such that inner layer maintains the characteristics of the cut resistant fabric.

The plastic is applied into the mold to form the housing around the inner layer of the cut resistant fabric and the computing device. The plastic impregnates the outer layer of the cut resistant fabric to form a hybrid layer of polyurea and cut resistant fabric mix. A protective shield is placed in the mold to limit the amount of the plastic hardening on the display of the mobile electronic device. The plastic in liquid form or a flowable state is injected into the mold. The plastic hardens to a solid to form a single unitary housing around the mobile electronic device and components.

Different embodiments of the present invention may provide different outer layers of the housing. In one embodiment, the housing provides a hard, rigid surface as the exterior of the housing. In another embodiment, an outer cushioning layer, such as a shock absorption layer, may be located as the outermost surface to provide additional impact resistance. Different embodiments of the present invention may provide different types of outer layers depending on the environment in which the device is used. One embodiment provides a hard, rigid surface as the outermost surface of the housing. Another embodiment provides an outer cushioning layer as the outer layer of the housing.

The housing 100 constructed from a single, unitary piece eliminates seams within the housing 100. Seams within the housing create a weak point in the housing. A person can insert objects into the seam to break the housing off the mobile electronic device. Eliminating the seams increases the difficulty of removing the housing from the mobile electronic device. Installation of the housing 100 on the mobile computing device 102 will be described in greater detail below.

Figure 2:
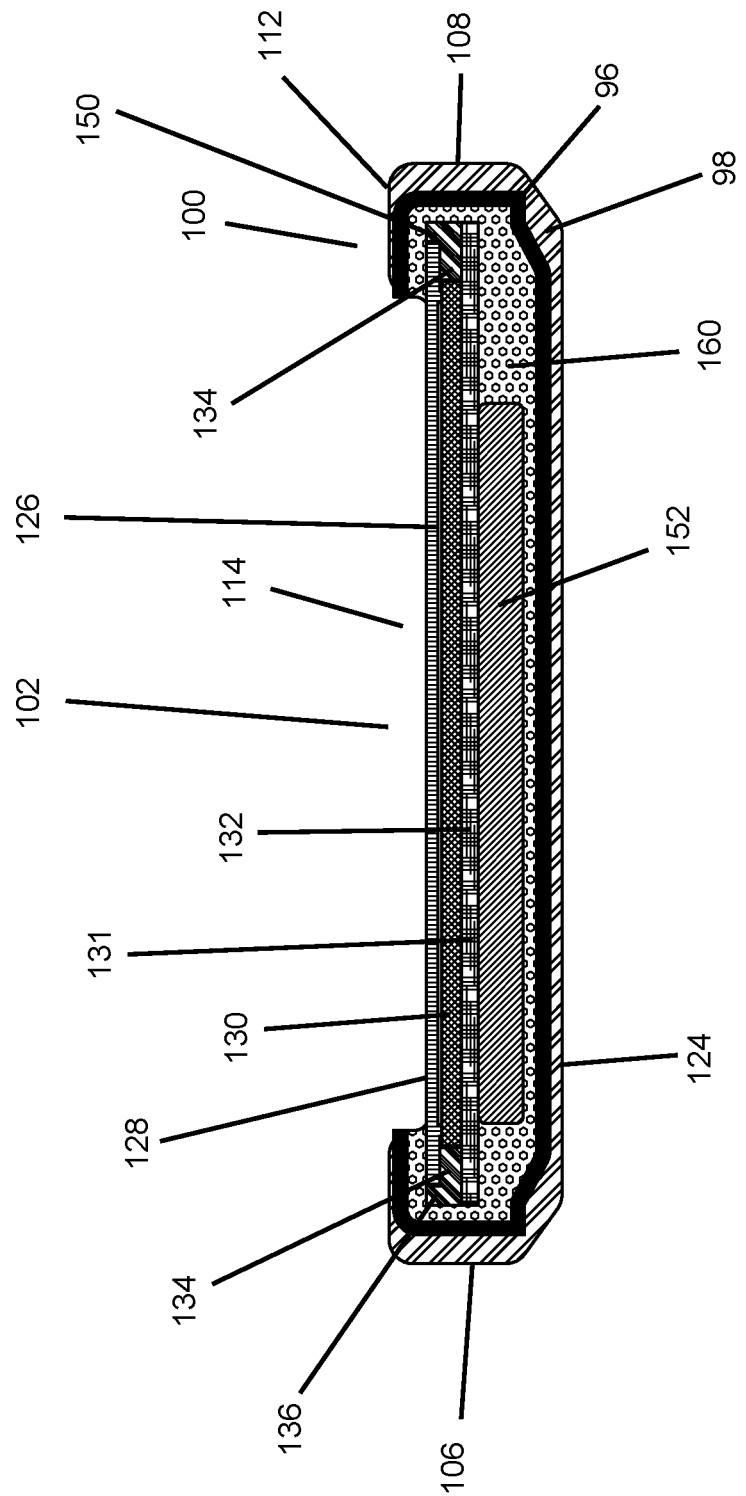
FIG. 2 is a sectional view thereof.
Figure 3:
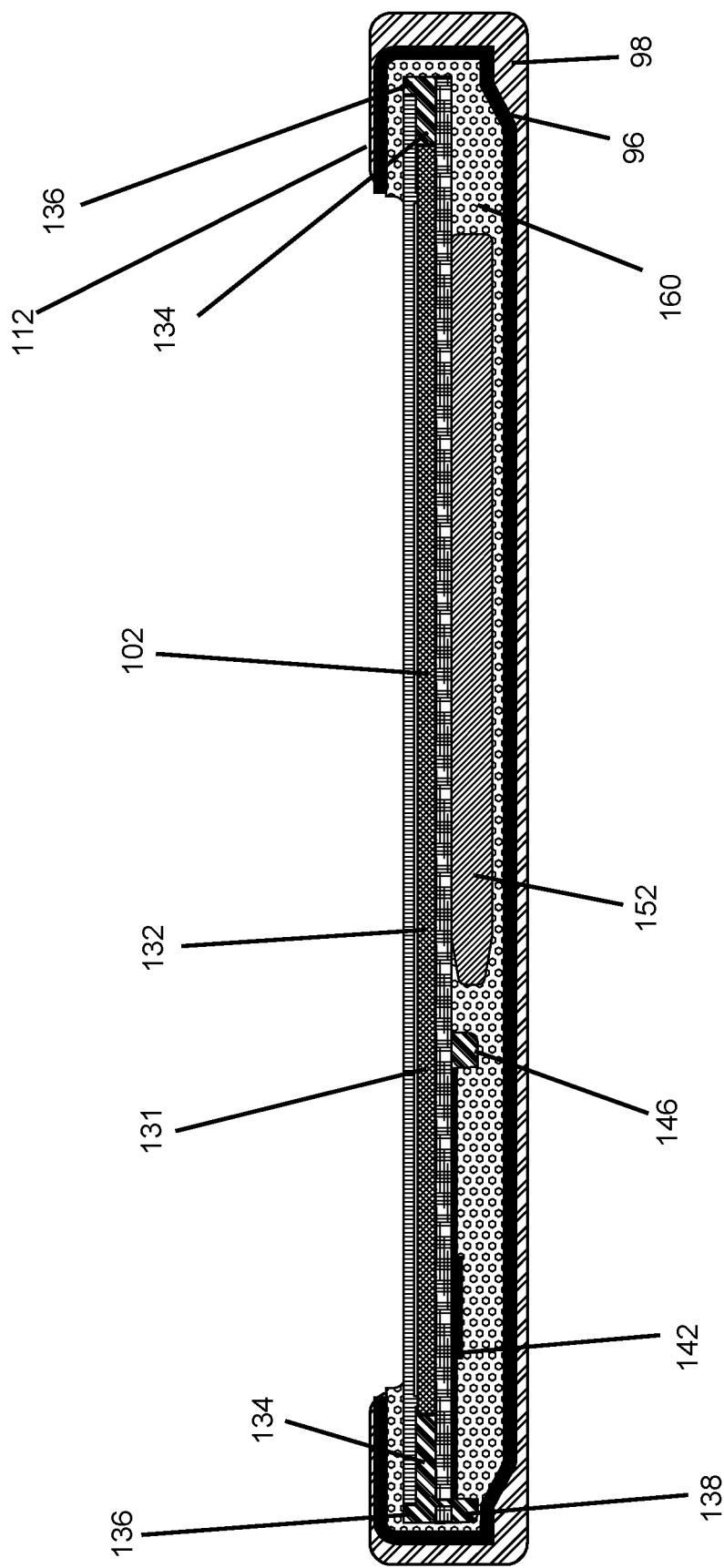
FIG. 3 is a sectional view thereof.

To increase protection on the computing device, a cut resistant fabric is positioned interior of the rigid layer 98. The cut resistant fabric 96 is located interior of the rigid layer 98 of the housing 100. The rigid layer 98 is formed externally adjacent the cut resistant fabric layer 96 as shown in FIGS. 2 and 3. The cut resistant fabric layer 96 contacts the rigid layer 98.

As discussed above, the housing may include a single layer or two layers of the cut resistant fabric. One embodiment of the housing provides an outer layer of the cut resistant fabric 96 embedded in the rigid layer 98. In such an embodiment, the rigid layer 98 is constructed from a plastic that hardens from a liquid and/or flowable state to a solid to form a rigid surface. The cut resistant layer 96 is placed within the mold to allow the liquid to impregnate the outer layer of the cut resistant fabric. The liquid contacts the outer layer and hardens into a solid. Hardening the plastic to a solid embeds the outer layer of the cut resistant fabric within the rigid layer.

The shock absorption layer 160 contacts the cut resistant fabric layer 96. The cut resistant fabric layer 96 contacts the rigid layer 98. In one embodiment, an inner layer of the cut resistant fabric is located internally adjacent the outer layer. Such an inner layer is not impregnated with the hardening plastic, such as the polyurea plastic. The inner layer maintains the characteristics of the cut resistant fabric.

The rigid layer 98 and cut resistant fabric layer 96 form an opening for viewing window 114 in the front section of the housing, such as front wall 112. The cut resistant fabric layer 96 and rigid layer 98 extend in front of the electronic device and the display to form the front wall 112 with the viewing window 114. The cut resistant fabric layer 96 and rigid layer 98 strengthen the housing and front wall 112 to limit removal of the device through the viewing window 114.

FIGS. 2 and 3 show cross-sections of the housing 100 and the mobile electronic device 102 within the housing 100, the rigid layer 98, and the cut resistant layer, such as the cut resistant fabric layer 96. Additional layers of the cut resistant fabric layer may be added to the housing as discussed herein. The housing 100 stores the components of the mobile electronic device. Such components include, but are not limited to a display, such as LCD panel 130, an input device, such as touchscreen 128, a circuit board 142, such as a printed circuit board, and a battery 152. A heat sink or other thermal management device or material may be placed adjacent the circuit board 142. The housing 100 stores the components in a functioning arrangement to allow usage of the mobile electronic device. As discussed above, the housing of one embodiment limits access to the mobile electronic device while allowing usage of the device.

A positioning frame 131 provides additional structure and rigidity to the housing 100 with positioning fingers, positioning arms, and a positioning rib. The positioning rib 132 of one embodiment is constructed from carbon fiber. Other embodiments of the positioning rib are constructed from a metal such as aluminum, magnesium, or a combination thereof, or a rigid material such as high stiffness plastics. The positioning rib 132 provides positioning arms 134, 148 that extend laterally from the positioning rib towards the front wall 112. These positioning arms 134, 148 are constructed from a rigid material, such as plastic or polyurea plastic. Positioning fingers 136, 150 extend laterally from the positioning arms towards the front wall 112.

In one embodiment, the positioning rib, the positioning arms, the positioning fingers, and the positioning legs are constructed from a single unitary piece of rigid material, including but not limited to carbon fiber, aluminum, or magnesium. In another embodiment, the positioning rib, the positioning arms and positioning fingers, and the positioning legs are constructed from the same rigid material, including but not limited to carbon fiber, aluminum, or magnesium. The positioning arms and fingers of one embodiment may be constructed from individual components and secured to the positioning rib.

In one embodiment, the positioning arms 134, 148 with positioning fingers 136, 150 are constructed from a different material than the positioning rib 132. Such an embodiment provides a positioning rib constructed from a rigid material, including but not limited to carbon fiber, aluminum or magnesium. The positioning arms and fingers are constructed from plastic, such as polyurea plastic. The positioning arms and fingers attach to the positioning rib.

The positioning arms 134, 148 form a display aperture for placement of the display 126. In one embodiment, the display 126 is an LCD 130. The display 126 abuts the positioning rib 132. The positioning rib 132 supports the display 126 to reduce deformation on the display 126. The display 132 is located fore of the positioning rib 132 towards the front wall 112 of the housing 100. The display 126 is positioned between the positioning arms 134, 148. These positioning arms 134, 148 abut the display 126 to position the display 126, such as LCD panel 130, within the housing 100.

The positioning fingers 136, 150 extended laterally from the positioning arms 134, 148 towards the front wall 112. The positioning fingers 136, 150 extending fore of the display 126 provides an opening for placement of the input device, such as touchscreen 128. The positioning fingers 136, 150 position the touchscreen 128 in front of the LCD panel 130 or display 126.

The positioning rib 132 positions the LCD panel 130 with positioning arms 134, 148 and positions the touchscreen 128 with positioning fingers 136, 150. The positioning rib 132 also positions the circuit board 142 and the cushioning 160, such as foam. Positioning rib 132 positions the circuit board 142 aft of the positioning rib 132. Positioning legs 138, 146 extend laterally aft of the positioning rib 132.

In one embodiment, the positioning legs 138, 146 are constructed from a different material than the positioning rib 132. Such an embodiment provides a positioning rib constructed from a rigid material, including but not limited to carbon fiber, aluminum, or magnesium. The positioning legs of such an embodiment are constructed from plastic, such as polyurea plastic. The positioning legs attach to the positioning rib.

The positioning legs 138, 146 form a board aperture for placement of the circuit board 142. In one embodiment, the circuit board 142 is a printed circuit board 142. The circuit board 142 abuts the positioning rib 132. The positioning rib 132 supports the circuit board 142 to reduce deformation on the circuit board 142. The circuit board is located aft of the positioning rib 132 towards the rear wall 124 of the housing 100.

The board 142 is positioned between the positioning legs 138, 146. These positioning legs 138, 146 abut the board 142 to position the board 142 within the housing 100.

Positioning legs 138, 146 extend laterally aft towards the rear wall 124. The positioning legs 138, 146 anchor the positioning rib 132 in the cushioning 160. Such anchoring within the cushioning 160 positions the positioning rib 132 and the components of the mobile electronic device 102.

The battery 152 abuts the positioning rib 132 to provide additional support for the battery 152. As discussed above, the positioning rib 132 reduces deformation on the battery 152.

Cushioning 160, such as foam, is installed around the positioning frame 131. The foam provides cushioning around the components of the electronic device. The foam is located between the walls of the housing and the components of the electronic device. Foam is positioned in front of the touchscreen 128 between the touch screen and the front wall. Cushioning 160 is located within the rigid layer 98 and the cut resistant layer, such as the cut resistant fabric layer 96.

The foam provides a viewing window. Foam is also positioned to the sides of the components and positioning frame 131. Foam is also positioned behind the components and positioning frame 131. Foam is also located above and below the components and positioning frame 131. The foam encases the components similar to the housing 100, the rigid layer 98, and the cut resistant fabric layer 96. In one embodiment, the foam is positioned between the components and the walls of the housing. In such an embodiment, foam is also positioned between the positioning frame and the walls of the housing.

The foam can be of various densities. The foam provides impact resistance to the electronic device. The foam of one embodiment is not electrically conductive. The foam of one embodiment is thermally conductive to distribute heat from the electronic device.

Additives may be added to the foam to provide additional beneficial qualities to the foam. Flame retardant and/or anti-microbial additives may be added to the foam.

The foam also provides positioning pressure for positioning the positioning frame and the components in the housing. The positioning legs anchor into the foam for positioning the components and positioning frame within the housing. Such positioning pressure provided by the foam of one embodiment of the present invention eliminates the need for some adhesives, screws, and other fasteners to maintain the components in place.

The foam also increases the ruggedness of the device for harsh environmental conditions. The foam provides strong protection against both water and gas penetration into the components. The foam also limits the amount of water, chemicals, and dust to which the components are exposed.

The housing 100 provides a rigid layer and cut resistant layer of protection for the electronic device. The housing 100 protects against impacts and cutting and abrasions into the housing. The housing of one embodiment is constructed from plastic via standard injection molding. Another embodiment is constructed from sprayed or molded plastic such as polyurea mixtures. Another embodiment is constructed from welded polycarbonate.

For anti-intrusion scenarios, the plastic selected for the housing is resistant to cracking. Such plastic affixes to the electronic device in a non-removable fashion. The housing of such an embodiment is formed around the components of the electronic device. Such molding of the housing around the components creates a seamless case for the electronic device, such as a unitary housing around the electronic device and the components.

Additives may also be added to the structure of the housing. Such additives may include antimicrobial agents and fire-retardant agents. These agents added to the housing provide beneficial qualities to the housing.

Figure 5:
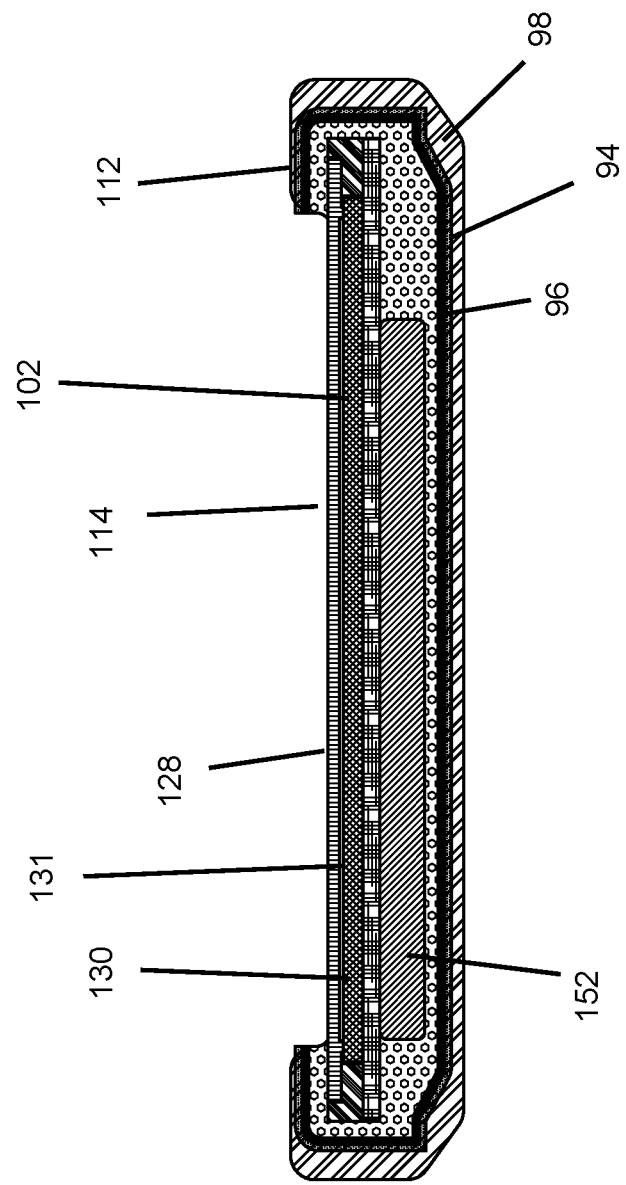
FIG. 5 is a sectional view of one embodiment of the present invention.
Figure 6:
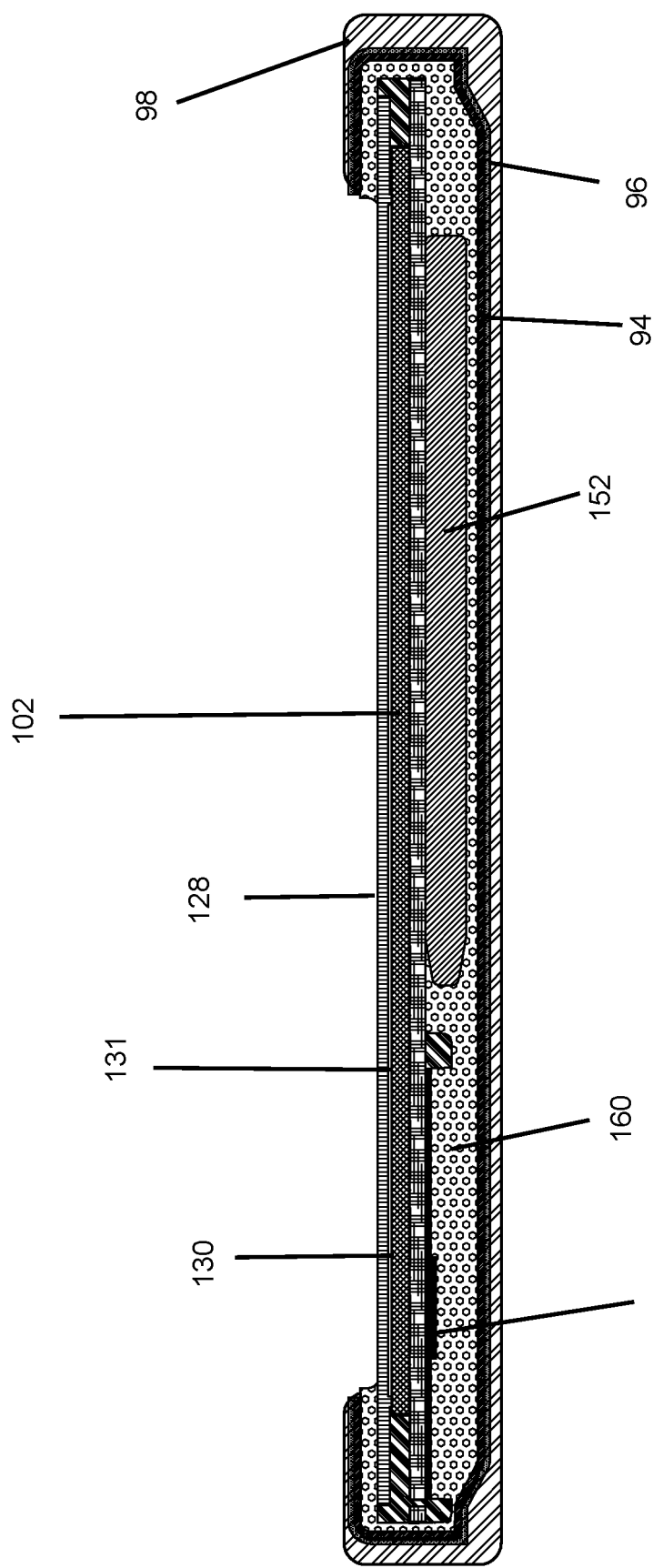
FIG. 6 is a sectional view thereof.

FIGS. 5 and 6 show an embodiment with at least two layers of the cut resistant fabric, outer layer 96 and inner layer 94. The outer layer 96 is impregnated with the hardening material that forms rigid layer 98. Such hardening material may include a plastic that hardens from a liquid to a solid, including, but not limited to polyurea plastic. The cut resistant fabric mixes with the hardening material to form a hybrid layer, such as layer 96 that provides a more rigid cut resistant fabric. The hardening material contacts the outer layer 96 and hardens to mix with the outer layer 96. The hardening material increases the rigidity of the cut resistant fabric of the outer layer 96.

Inner layer 94 provides an additional layer of cut resistant fabric. A single piece of cut resistant fabric may form the inner layer 94 and the outer layer 96. In another embodiment, two pieces or multiple pieces of cut resistant fabric may form the inner layer 94 and the outer layer 96.

The outer layer 96 limits the amount of contact of inner layer 94 with the hardening material that forms rigid layer 98. Inner layer 94 maintains the properties of the cut resistant fabric. The inner layer 94 does not become as rigid as outer layer 96.

Continuing to refer to FIGS. 5 and 6, the inner layer 94 and the outer layer 96 partially encapsulate the mobile computing device 102 and the components of the device. The inner layer 94 and outer layer 96 form an opening for viewing window 114 in the front wall 112. The inner layer 94, outer layer 96, and rigid layer 98 extend in front of the electronic device and the display to form the front wall 112 with the viewing window 114. The inner layer 94, outer layer 96, and rigid layer 98 strengthen the housing and front wall 112 to limit removal of the device through the viewing window 114.

The shock absorption layer 160, such as foam, is located within the inner layer 94 and outer layer 96. The shock absorption layer 160 contacts the inner layer 94. The inner layer 94 contacts the outer layer 96. The outer layer 96 contacts the rigid layer 98. Components, such as a display 126, an input device, such as touchscreen 128, a circuit board 142, such as a printed circuit board, and a battery 152 are at least partially surrounded by the shock absorption layer 160, such as foam, the inner layer 94, the outer layer 96, and the rigid layer 98. The positioning frame 131 positions such components within the shock absorption layer 160, such as the foam, the inner layer 94, the outer layer 96, and the rigid layer 98.

In some embodiments, an additional outer layer of cushioning may be provided at the outer surface of the walls. Such a layer may include but is not limited to a shock absorption layer, as shown in U.S. patent application Ser. No. 16/045,417 entitled "Internal Support for Electronic Device and Method for Encasing an Electronic Device" filed on Jul. 25, 2018, which is hereby incorporated by reference, located exterior to the security shell of the housing 100. In one embodiment, the shock absorption layer 162 is thicker to increase impact resistance. In one embodiment, the shock absorption layer is constructed from a foam similar as foam 160. In another embodiment, the shock absorption layer is constructed from silicone, rubber, foam or other viscoelastic material. Such a softer layer also provides a softer outer layer of the housing if a user chooses to weaponize the device by hitting or striking a person with the device and the housing.

To create the seamless case, the components are positioned onto the positioning frame as shown in FIGS. 2 and 3. The display, such as the LCD panel is placed between the positioning arms of the positioning rib. The touchscreen is then positioned over the display between the positioning fingers. The board is placed between the positioning legs. The battery is placed adjacent the positioning rib. Foam is then applied to the components and the positioning frame. The foam and components are then placed within a mold along with the support rib. The cut resistant fabric is positioned around the components and foam to form the viewing window in either a single layer or multiple layer configuration. The plastic is then applied to the components, foam, ribs, and layer(s) of cut resistant fabric to form the housing. The plastic cures to form the seamless housing.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A protective device for protecting a mobile electronic device by providing rigid support and impact resistance to components of the electronic device while allowing viewing of a display of the mobile electronic device, the protective device comprising:
    a housing for storing the components of the electronic device;
    a rigid layer of the housing at least partially enclosing the components of the device; and
    a cut resistant fabric layer positioned internally of the rigid layer, wherein the rigid layer covers at least a portion of the cut resistant fabric layer, wherein the cut resistant fabric layer is constructed from a cut resistant fabric.

2. The device of claim 1, wherein the rigid layer at least partially impregnates the cut resistant fabric layer.

3. The device of claim 1, wherein the cut resistant fabric layer is positioned between the components and the rigid layer, wherein the rigid layer limits exposure of the cut resistant fabric layer.

4. The device of claim 1, wherein the rigid layer is formed from a hardening plastic that hardens from a liquid to a solid.

5. The device of claim 4, wherein the rigid layer is formed from polyurea plastic.

6. The device of claim 4, wherein the liquid of the hardening plastic hardens exterior of the cut resistant fabric layer to embed the cut resistant fabric layer within the rigid layer, wherein the liquid of the hardening plastic impregnates the cut resistant to stiffen the cut resistant fabric layer.

7. The device of claim 1, wherein the rigid layer forms a unitary housing around the components.

8. The device of claim 7 wherein the cut resistant fabric layer is at least partially embedded within the rigid layer.

9. The device of claim 8, further comprising:
    an inner layer of cut resistant fabric, wherein the inner layer is positioned interior of the cut resistant fabric layer.

10. The device of claim 9, wherein the inner layer of the cut resistant fabric is located inward from the cut resistant fabric layer and the rigid layer, wherein the cut resistant fabric layer abuts the rigid layer and is located inward from the rigid layer.

11. A protective device for protecting a mobile electronic device by providing rigid support and impact resistance to components of the electronic device while allowing viewing of a display of the mobile electronic device, the protective device comprising:
    a housing for storing the components of the electronic device;
    a rigid layer of the housing at least partially enclosing the components of the device; and
    a first layer of cut resistant fabric partially enclosing the components of the device, the first layer positioned internally adjacent the rigid layer, wherein the first layer of the cut resistant fabric is positioned between the components and the rigid layer;
    wherein the first layer of the cut resistant fabric is located inward from the rigid layer, wherein the first layer of the cut resistant fabric is located exterior of the components, wherein the rigid layer is located exterior of the first layer of the cut resistant fabric.

12. The device of claim 11, wherein the rigid layer is formed from a hardening plastic that hardens from a liquid to a solid.

13. The device of claim 12, wherein the first layer of the cut resistant fabric is at least partially impregnated with the hardening plastic.

14. The device of claim 13, wherein the first layer of the cut resistant fabric is at least partially embedded within the hardening plastic.

15. The device of claim 14 further comprising:
    an inner layer of the cut resistant fabric, wherein the inner layer is positioned interior of the first layer of the cut resistant fabric and the rigid layer, wherein the inner layer of the cut resistant fabric is located adjacent the first layer of the cut resistant fabric and abuts the first layer of the cut resistant fabric.

16. The device of claim 15 further comprising:
foam installed within the housing wherein the foam is located interior of the inner layer of the cut resistant fabric, wherein the foam is located adjacent the inner layer of the cut resistant fabric.

17. The device of claim 16, wherein the components of the device are positioned within the inner layer of the cut resistant fabric and the first layer of the cut resistant fabric prior to hardening the rigid layer, wherein the hardening plastic in a flowable state contacts the outer layer of the cut resistant fabric to harden as the rigid layer when contacting the outer layer of the cut resistant fabric, wherein the rigid layer forms a unitary housing around the components.

18. A protective device for protecting a mobile electronic device by providing rigid support and impact resistance to components of the electronic device while allowing viewing of a display of the mobile electronic device, the protective device comprising:
a housing for storing the components of the electronic device;
a rigid layer of the housing at least partially enclosing the components of the device, wherein the rigid layer forms a unitary housing around the components;
a first layer of cut resistant fabric partially enclosing the components of the device, the first layer of the cut resistant fabric positioned internally of the rigid layer, wherein the first layer of the cut resistant fabric is positioned between the components and the rigid layer;
wherein the first layer of the cut resistant fabric is constructed from a flexible fabric, wherein the rigid layer impregnates at least a portion of the first layer of the cut resistant fabric to stiffen the first layer of the cut resistant fabric.

19. The device of claim 18 further comprising:
a front section of the housing;
a viewing window formed in the front section;
wherein a first side of the first fabric layer is positioned laterally outward to a first side of the viewing window and the components;
wherein the rigid layer is located laterally outward from the first side of the first layer of the cut resistant fabric, wherein the first layer of the cut resistant fabric is at least partially impregnated with the rigid layer.

20. The device of claim 18 further comprising:
a front section of the housing;
a viewing window formed in the front section;
wherein the first layer of the cut resistant fabric is positioned rearward of the viewing window;
wherein the rigid layer is located rearward from the first layer of the cut resistant fabric, wherein the first layer of the cut resistant fabric is at least partially impregnated with the rigid layer.

* * * * *